United States Patent
Tamagawa et al.

(10) Patent No.: US 10,601,147 B2
(45) Date of Patent: Mar. 24, 2020

(54) METHOD OF BONDING CORE WIRE AND BONDING OBJECT, ULTRASONIC BONDING DEVICE, AND JUNCTION BETWEEN CORE WIRE AND BONDING OBJECT

(71) Applicant: SUMITOMO WIRING SYSTEMS, LTD., Mie (JP)

(72) Inventors: Tatsuo Tamagawa, Mie (JP); Masamichi Yamagiwa, Mie (JP); Takuya Suzuki, Mie (JP); Daichi Miura, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 0 days.

(21) Appl. No.: 16/344,198

(22) PCT Filed: Oct. 12, 2017

(86) PCT No.: PCT/JP2017/036920
§ 371 (c)(1),
(2) Date: Apr. 23, 2019

(87) PCT Pub. No.: WO2018/079273
PCT Pub. Date: May 3, 2018

(65) Prior Publication Data
US 2019/0260141 A1    Aug. 22, 2019

(30) Foreign Application Priority Data

Oct. 31, 2016  (JP) ................................. 2016-212975

(51) Int. Cl.
*H01R 4/02*  (2006.01)
*B23K 20/10*  (2006.01)
(Continued)

(52) U.S. Cl.
CPC ............ *H01R 4/023* (2013.01); *B23K 20/10* (2013.01); *H01R 43/02* (2013.01);
(Continued)

(58) Field of Classification Search
CPC .... H02G 15/1806; H01R 4/023; H01R 43/02; H01R 43/0207; H01R 4/185; B23K 20/10;
(Continued)

(56) References Cited

U.S. PATENT DOCUMENTS 3,590,822 A * 7/1971 Ackerman ........... A61N 1/0565
607/122
5,127,916 A * 7/1992 Spencer ................. A61B 90/39
606/185

(Continued)

FOREIGN PATENT DOCUMENTS

JP    2004-220933    8/2004
JP    2007-012329    1/2007
(Continued)

OTHER PUBLICATIONS

Official Communication issued in International Bureau of WIPO Patent Application No. PCT/JP2017/036920, dated Dec. 19, 2017.

*Primary Examiner* — Jean F Duverne
(74) *Attorney, Agent, or Firm* — Greenblum & Bernstein, P.L.C.

(57) ABSTRACT

The present invention enables a core wire that contains a plurality of strands and a bonding object to be bonded more reliably using an ultrasonic bonding device that cantilever supports a pressing portion that performs ultrasonic bonding. A bonding object (for example, a terminal) is supported as on a stage, a core wire is overlaid on the bonding object, and the core wire and the bonding object are ultrasonically bonded in a state where the core wire is pressed toward the (Continued)

bonding object, using a pressing portion that is supported in cantilever fashion. During ultrasonic bonding, a pressing surface of the pressing portion is inclined in a pressing direction progressively toward a side where the pressing portion is cantilever supported, and also a bonding surface of the bonding object is inclined in the pressing direction progressively toward the side where the pressing portion is cantilever supported.

7 Claims, 9 Drawing Sheets

(51) Int. Cl.
 *H01R 43/02* (2006.01)
 *B23K 101/36* (2006.01)
 *H01R 4/18* (2006.01)

(52) U.S. Cl.
 CPC ...... *H01R 43/0207* (2013.01); *B23K 2101/36* (2018.08); *H01R 4/185* (2013.01); *H01R 4/187* (2013.01)

(58) Field of Classification Search
 CPC .... A61B 5/6851; A61B 90/39; A61N 1/0565; A61M 25/09
 USPC .......................................................... 439/874
 See application file for complete search history.

(56) References Cited

U.S. PATENT DOCUMENTS

| | | | |
|---|---|---|---|
| 5,228,453 A * | 7/1993 | Sepetka | A61M 25/09 600/434 |
| 6,881,194 B2 * | 4/2005 | Miyata | A61B 5/6851 600/585 |
| 9,666,955 B2 * | 5/2017 | Sugino | H02G 15/1806 |
| 2015/0099406 A1 | 4/2015 | Tsuge | |
| 2019/0052040 A1 | 2/2019 | Suzuki et al. | |

FOREIGN PATENT DOCUMENTS

| | | |
|---|---|---|
| JP | 2014-143177 | 8/2014 |
| JP | 2015-076208 | 4/2015 |
| WO | 2017/145989 | 8/2017 |

\* cited by examiner

Sample No.

METHOD OF BONDING CORE WIRE AND BONDING OBJECT, ULTRASONIC BONDING DEVICE, AND JUNCTION BETWEEN CORE WIRE AND BONDING OBJECT

FIELD OF THE INVENTION

The present invention relates to a technology that ultrasonically bonds a core wire that contains a plurality of strands to a bonding object.

BACKGROUND OF THE INVENTION

Patent Literature 1 discloses a technology that sandwiches a wire bonding portion of a terminal and a core wire of an electrical wire between an anvil and an ultrasonic horn and ultrasonically bonds them together.

RELATED ART

Patent Literature

Patent Literature 1: Japanese Patent Laid-open Publication No. 2014-143177

SUMMARY OF THE INVENTION

Problems to be Solved by the Invention

However, as disclosed in Patent Literature 1, when ultrasonically bonding the wire bonding portion of the terminal and the core wire of the electrical wire, there may be cases where the ultrasonic vibration energy does not transmit well to a bonding portion of the core wire and terminal, and bonding the two components may not be possible.

The inventors of the instant application realized that one cause for bonding of a terminal and a core wire not going well is that an ultrasonic horn that transmits the ultrasonic vibration energy may incline and the core wire may escape through a gap between the ultrasonic horn and an anvil.

Specifically, examples of ultrasonic bonding devices are those having a configuration that cantilever supports the ultrasonic horn and those having a configuration that supports the ultrasonic horn at both ends. In the configuration that cantilever supports the ultrasonic horn, the ultrasonic horn may incline when pressure is applied to the core wire and the terminal. In such a case, a surface where the ultrasonic horn presses against the core wire may be inclined with respect to a direction in which the ultrasonic horn presses the core wire, and therefore a force acts on the core wire in a direction to push the core wire out. Accordingly, there is a risk that the core wire may be pushed out before the core wire is ultrasonically bonded to the terminal, and that the ultrasonic bonding may fail. The other type of ultrasonic bonding device has a configuration in which the ultrasonic horn is supported at the two front and back directions, and therefore the device is large and device costs may be high.

In view of the above, the present invention is configured to enable a core wire that contains a plurality of strands and a bonding object to be bonded more reliably using an ultrasonic bonding device that cantilever supports a pressing portion that performs ultrasonic bonding.

Means for Solving the Problems

In order to resolve the above-noted issues, a first aspect is a method of bonding a core wire and a bonding object that ultrasonically bonds a core wire that contains a plurality of strands and a bonding object, the method including: (a) a step of supporting the bonding object as on a stage; (b) a step of overlaying the core wire on the bonding object; and (c) a step of ultrasonically bonding the core wire and the bonding object in a state where the core wire is pressed toward the bonding object, using a pressing portion that is supported in cantilever fashion. In step (c), a state is achieved where a pressing surface of the pressing portion is inclined in a pressing direction of the pressing portion progressively toward a side where the pressing portion is cantilever supported, and also a bonding surface of the bonding object is inclined in the pressing direction of the pressing portion progressively toward the side where the pressing portion is cantilever supported.

A second aspect is the method of bonding the core wire and bonding object according to the first aspect, in which the bonding object is supported as on a stage on a placement portion that is capable of supporting the bonding object in a state where the bonding object is inclined in the pressing direction of the pressing portion progressively toward the side where the pressing portion is cantilever supported.

A third aspect is the method of bonding the core wire and bonding object according to the second aspect, in which a component is used as the placement portion which has a plurality of projections formed on a portion toward the opposite side of the placement portion from the side where the pressing portion is cantilever supported, the projections protruding past a portion on the side where the pressing portion is cantilever supported.

A fourth aspect is the method of bonding the core wire and bonding object according to any one of the first to third aspects, in which the core wire is ultrasonically bonded to a terminal as the bonding object.

In order to resolve the above-noted issues, an ultrasonic bonding device according to a fifth aspect includes a placement portion that supports a bonding object as on a stage; a pressing portion that presses a core wire overlaid on the bonding object against the bonding object on the placement portion; and an ultrasonic vibration imparter that imparts ultrasonic vibration to the pressing portion in a state where the pressing portion is supported in cantilever fashion. The ultrasonic vibration imparter, when the core wire is pressed against the bonding object with the pressing portion, supports the pressing portion in cantilever fashion in a manner where a pressing surface of the pressing portion inclines in a pressing direction of the pressing portion progressively toward a side where the pressing portion is cantilever supported. The placement portion supports the bonding object in a state where the bonding object is inclined in the pressing direction of the pressing portion progressively toward the side where the pressing portion is cantilever supported.

A sixth aspect is the ultrasonic bonding device according to the fifth aspect, in which a plurality of projections are formed on a portion of the placement portion toward the opposite side of the placement portion from the side where the pressing portion is cantilever supported, the projections protruding past a portion on the side where the pressing portion is cantilever supported.

In order to resolve the above-noted issues, a junction between a core wire and a bonding object according to a seventh aspect includes a core wire that contains a plurality of strands, and a bonding object that is ultrasonically bonded to the core wire in a state overlapping with the core wire. A plurality of depressions are formed on a portion corresponding to a first side of a region on the bonding object that is ultrasonically bonded to the core wire, which is on the opposite side of the bonding object from the core wire. In addition, the core wire is a core wire of an electrical wire having a coating formed on an outer circumference thereof, and the coating is stripped away at an end portion of the electrical wire and the end portion of the core wire is exposed. The bonding object is a terminal that includes a wire connection portion, which includes a plate-like portion, and a mating connection portion. In a state where the electrical wire extends in the opposite direction from the mating connection portion, the end portion of the core wire is ultrasonically bonded to the plate-like portion of the wire connection portion. A plurality of first depressions that reflect the shape of projections on a pressing portion for ultrasonic bonding are formed on an outward-facing portion of the end portion of the core wire on the opposite side from the plate-like portion of the wire connection portion, and second depressions that reflect projections on a placement portion for ultrasonic bonding are formed on an outward-facing surface of the plate-like portion of the wire connection portion on the opposite side from the end portion of the core wire, in a region that is narrower in an extension direction of the core wire than the region where the first depressions are formed, and that is biased toward a base end side of the end portion of the core wire.

Effect of the Invention

According to the first aspect, when the core wire and the bonding object are ultrasonically bonded in a state where the core wire is pressed toward the bonding object, using the pressing portion that is supported in cantilever fashion, the pressing portion inclines and the pressing surface of the pressing portion is inclined in the pressing direction of the pressing portion progressively toward the side where the pressing portion is cantilever supported. Given this, when the bonding surface of the bonding object is in a state where the bonding surface is inclined in the pressing direction of the pressing portion progressively toward the side where the pressing portion is cantilever supported, a positional relationship that is as parallel as possible results between the pressing surface of the pressing portion and the bonding surface of the bonding object. Then, at the time of ultrasonic bonding, the core wire is less likely to be pushed out through the gap between the pressing portion and the bonding object. Accordingly, using the ultrasonic bonding device that cantilever supports the pressing portion that performs ultrasonic bonding, the core wire that contains the plurality of strands and the bonding object can be more reliably bonded.

According to the second aspect, when the bonding object is supported on the placement portion, a state can be achieved where the bonding surface is inclined in the pressing direction of the pressing portion progressively toward the side where the pressing portion is cantilever supported.

According to the third aspect, the bonding object can be supported as on a stage in a non-slip state by the plurality of projections, while the bonding object can be supported in a state where the bonding object is inclined in the pressing direction of the pressing portion progressively toward the side where the pressing portion is cantilever supported.

According to the fourth aspect, the core wire that contains the plurality of strands and the terminal can be more reliably bonded.

According to the fifth aspect, when the core wire and the bonding object are ultrasonically bonded in a state where the core wire is pressed toward the bonding object, using the pressing portion that is supported in cantilever fashion, the pressing portion inclines and the pressing surface of the pressing portion is inclined in the pressing direction of the pressing portion progressively toward the side where the pressing portion is cantilever supported. Given this, when the placement portion has a configuration that supports the bonding object in a state where the bonding object is inclined in the pressing direction of the pressing portion progressively toward the side where the pressing portion is cantilever supported, a positional relationship that is as parallel as possible results between the pressing surface of the pressing portion and the bonding surface of the bonding object. Then, at the time of ultrasonic bonding, the core wire is less likely to be pushed out through the gap between the pressing portion and the bonding object. Accordingly, using the ultrasonic bonding device that cantilever supports the pressing portion that performs ultrasonic bonding, the core wire that contains the plurality of strands and the bonding object can be more reliably bonded.

According to the sixth aspect, the bonding object can be supported as on a stage in a non-slip state by the plurality of projections, while the bonding object can be supported in a state where the bonding object is inclined in the pressing direction of the pressing portion progressively toward the side where the pressing portion is cantilever supported.

According to the seventh aspect, a junction between the core wire and the bonding object can be achieved as one in which the bonding object is supported as on a stage in a non-slip state by the plurality of projections on the placement portion, while the bonding object is supported in an inclined state and the core wire and the bonding object are ultrasonically bonded.

MODE FOR CARRYING OUT THE INVENTION

<Description of the Background>

Figure 1:
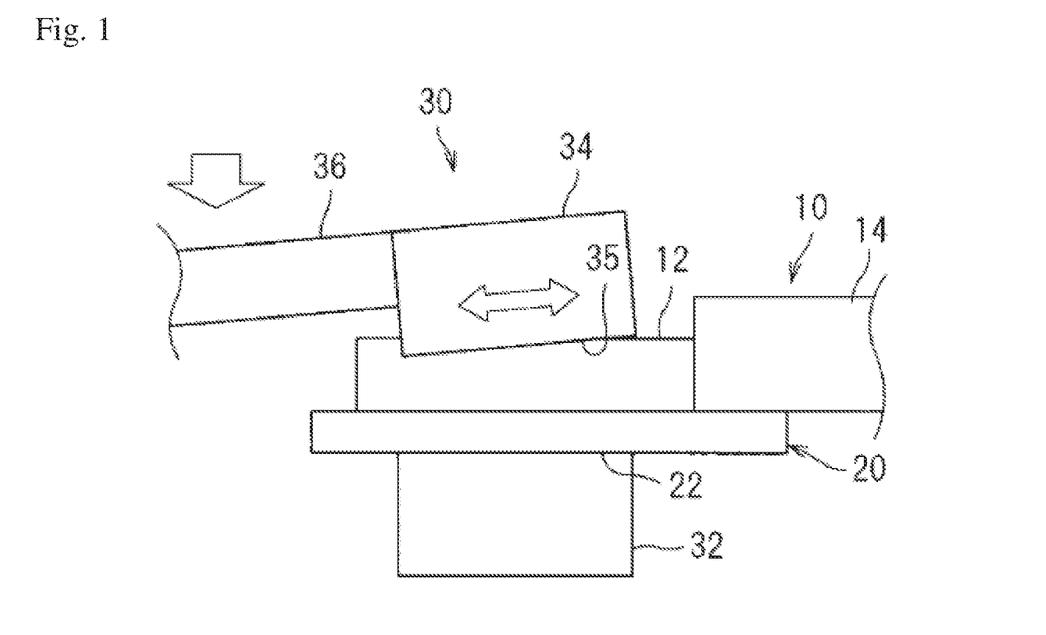
FIG. 1 is an explanatory diagram illustrating a phase where a core wire and a wire connection portion of a terminal are ultrasonically bonded in the background art.

For ease of description, the background of the present technology is described. FIG. 1 is an explanatory diagram illustrating a phase where a core wire 12 and a wire connection portion 22 of a terminal 20 are ultrasonically bonded.

An electrical wire 10 includes the core wire 12 and a coating 14. The coating 14 at an end portion of the electrical wire 10 is stripped away and the core wire 12 is exposed at the end portion of the electrical wire 10. The core wire 12 is configured by an aggregate (typically, a twisted body) of a plurality of strands.

The terminal 20 is formed by press molding a metal plate, or the like. The wire connection portion 22 that includes a plate-shaped portion is formed at one end portion of the terminal 20. The core wire 12 is ultrasonically bonded to a first principal surface (bonding surface) of the wire connection portion 22.

An ultrasonic bonding device 30 includes a placement portion 32 and a pressing portion 34. The wire connection portion 22 is supported on the placement portion 32 as on a stage, and the core wire 12 is arranged on the wire connection portion 22.

The pressing portion 34 is supported in cantilever fashion by an ultrasonic vibration imparter 36, and the pressing portion 34 presses the core wire 12 toward the wire connection portion 22. The ultrasonic vibration imparter 36 imparts ultrasonic vibration to the pressing portion 34.

Also, the ultrasonic vibration is imparted to the pressing portion 34 in a state where overlapped material of the wire connection portion 22 and the core wire 12 is sandwiched between the placement portion 32 and the pressing portion 34. The wire connection portion 22 and the core wire 12 are then ultrasonically bonded.

The inventors of the instant application manufactured a plurality of components in which the core wire 12 and the wire connection portion 22 are ultrasonically bonded using the ultrasonic bonding device 30 described above, whereupon the inventors found that, out of a large number of samples, a portion of the samples had a remarkably low fixation force. The fixation force is the tensile strength of the terminal and electrical wire.

Figure 2:
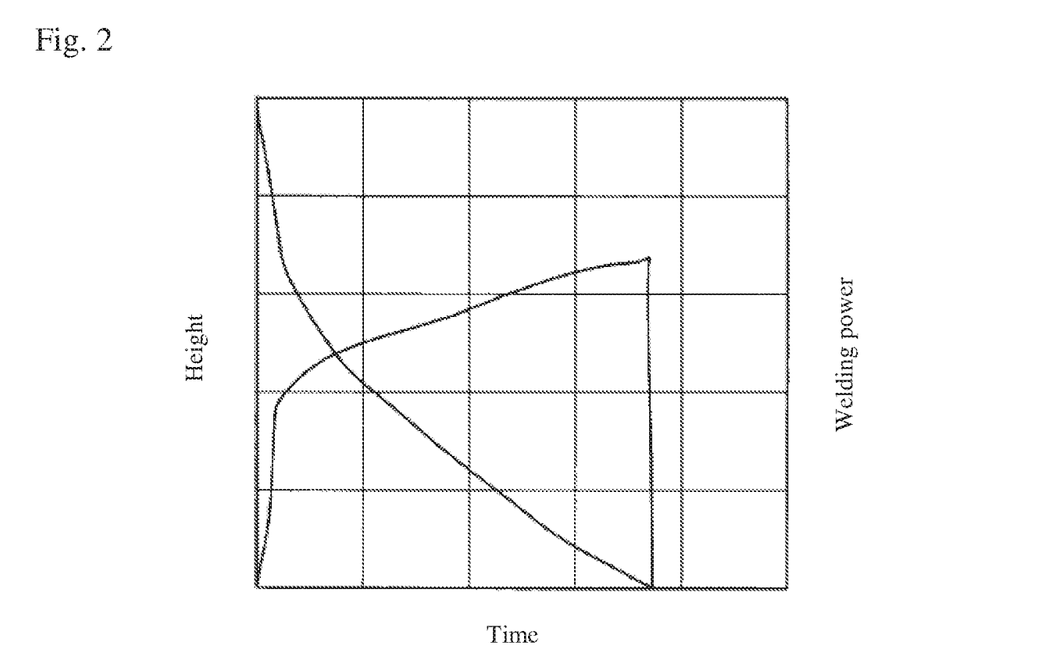
FIG. 2 illustrates a relationship of elapsed time in ultrasonic bonding to the height of a pressing portion and welding power for a sample having sufficient fixation force.

A relationship of elapsed time in ultrasonic bonding to the height of the pressing portion 34 and welding power (power imparted to a bonding location) was observed for samples having sufficient fixation force, whereupon the inventors found that, as illustrated in FIG. 2, the height of the pressing portion 34 grew smaller with the passage of time and, accompanying this, the welding power also increased.

Figure 3:
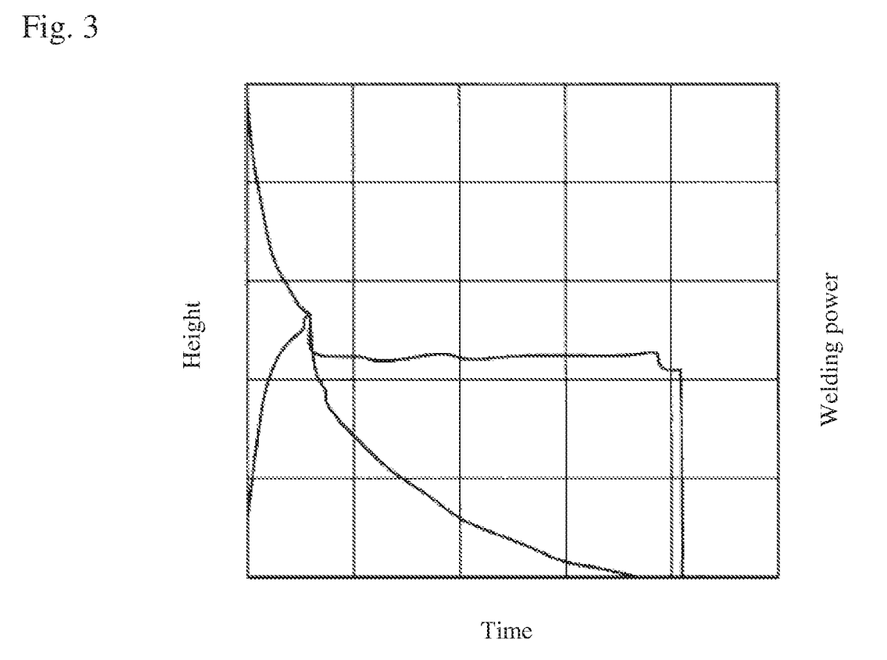
FIG. 3 illustrates a relationship of elapsed time in ultrasonic bonding to the height of the pressing portion and welding power for a sample having insufficient fixation force.

Meanwhile, a relationship of elapsed time in ultrasonic bonding to the height of the pressing portion 34 and welding power (power imparted to the bonding location) was likewise observed for samples having insufficient fixation force, which was as illustrated in FIG. 3. In this case, the inventors found that the height of the pressing portion 34 grew smaller with the passage of time, but partway through, a state was reached where the power imparted to the bonding location did not rise.

Figure 4:
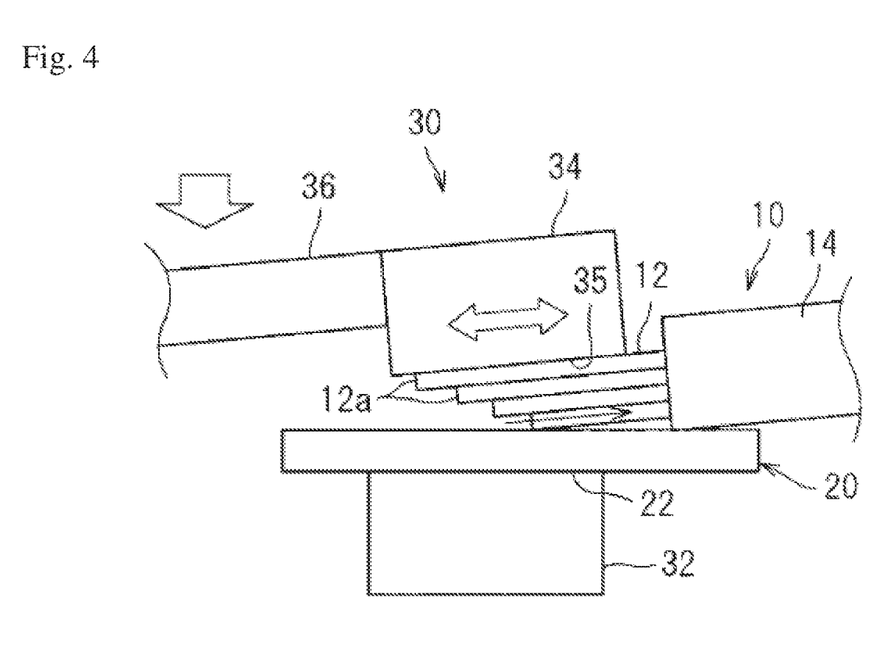
FIG. 4 is an explanatory diagram illustrating a relationship between each strand and a terminal in the background art.

Upon investigating the cause, the inventors of the instant application learned that, as illustrated in FIG. 4, the cause was that, of a plurality of strands 12a configuring the core wire 12, those near the wire connection portion 22 slip with respect to the wire connection portion 22 due to ultrasonic vibration. Specifically, the individual core wires 12a configuring the core wire are comparatively thin, wire-like bodies, and therefore can withstand a certain amount of force in a draw direction, but bend comparatively easily when a force in a compression direction is applied. Therefore, when attempting the ultrasonic bonding as described above, of the plurality of strands 12a, those near the wire connection portion 22 may successively displace toward a base end side thereof. Therefore, during ultrasonic bonding, an intended contact portion of the wire connection portion 22 and an intended contact portion of the core wire 12 may successively fluctuate, making it difficult to broaden a contact surface area where metal atoms of the two components are brought close enough together that they are capable of bonding. In addition, of the plurality of strands 12a, those near the wire connection portion 22 shift toward the base end side thereof due to the ultrasonic vibration, and therefore the contact surface area between the core wire 12 and the wire connection portion 22 may grow smaller.

The inventors of the instant application investigated further, and the cause of the core wire 12 slipping with respect to the wire connection portion 22, as described above, was determined to be that when the pressing portion 34, which is supported in cantilever fashion, presses against the core wire 12 or the like, the pressing portion 34 may tilt such that a base end portion of the pressing portion 34 is lower in a pressing direction than a forefront end portion thereof. Specifically, when the pressing portion 34 tilts as noted above, a gap may be created between the bonding surface of the wire connection portion 22 and a pressing surface of the pressing portion 34, the gap gradually widening toward the base end side of the core wire 12. In this state, when pressure is applied to the pressing portion 34, the core wire 12 may be pushed out toward the forefront end side of the pressing portion 34 (side where the gap gradually widens between the bonding surface and the pressing surface). Accordingly, the core wire 12 may slip with respect to the wire connection portion 22.

Based on the causes determined as described above, the inventors of the instant application conceived of the idea that when the pressing surface of the pressing portion 34 inclines in the pressing direction of the pressing portion 34 progressively toward the side where the pressing portion 34 is cantilever supported, the bonding surface of the wire connection portion 22 (bonding object) should be inclined in the same direction as the pressing surface 35. That is, a state should be created in which the pressing portion 34 inclines in the pressing direction of the pressing portion 34 progressively toward the side where the pressing portion 34 is cantilever supported. This is because by doing so, a degree to which the bonding surface of the wire connection portion 22 and the pressing surface of the pressing portion 34 gradually separate toward the base end side of the core wire 12 grows smaller compared to a case where only the pressing portion 34 inclines in response to a pressing force, and the core wire 12 is less likely to be pushed out toward the forefront end side of the pressing portion 34.

Accordingly, during ultrasonic bonding, the strands 12a are less likely to shift between the core wire 12 and the bonding object, such as the wire connection portion 22, and it becomes possible to bond an end portion of the core wire 12 and the bonding object, such as the wire connection portion 22, with as great a bonding strength as possible. In such a case, although the pressing surface of the pressing portion 34 and the bonding surface of the wire connection portion 22 may be parallel, there may also be cases where they are not parallel.

A method of bonding a core wire with a bonding object, an ultrasonic bonding device, and a junction between a terminal and core wire according to a more detailed embodiment are described below.

<Ultrasonic Bonding Device>

Figure 5:
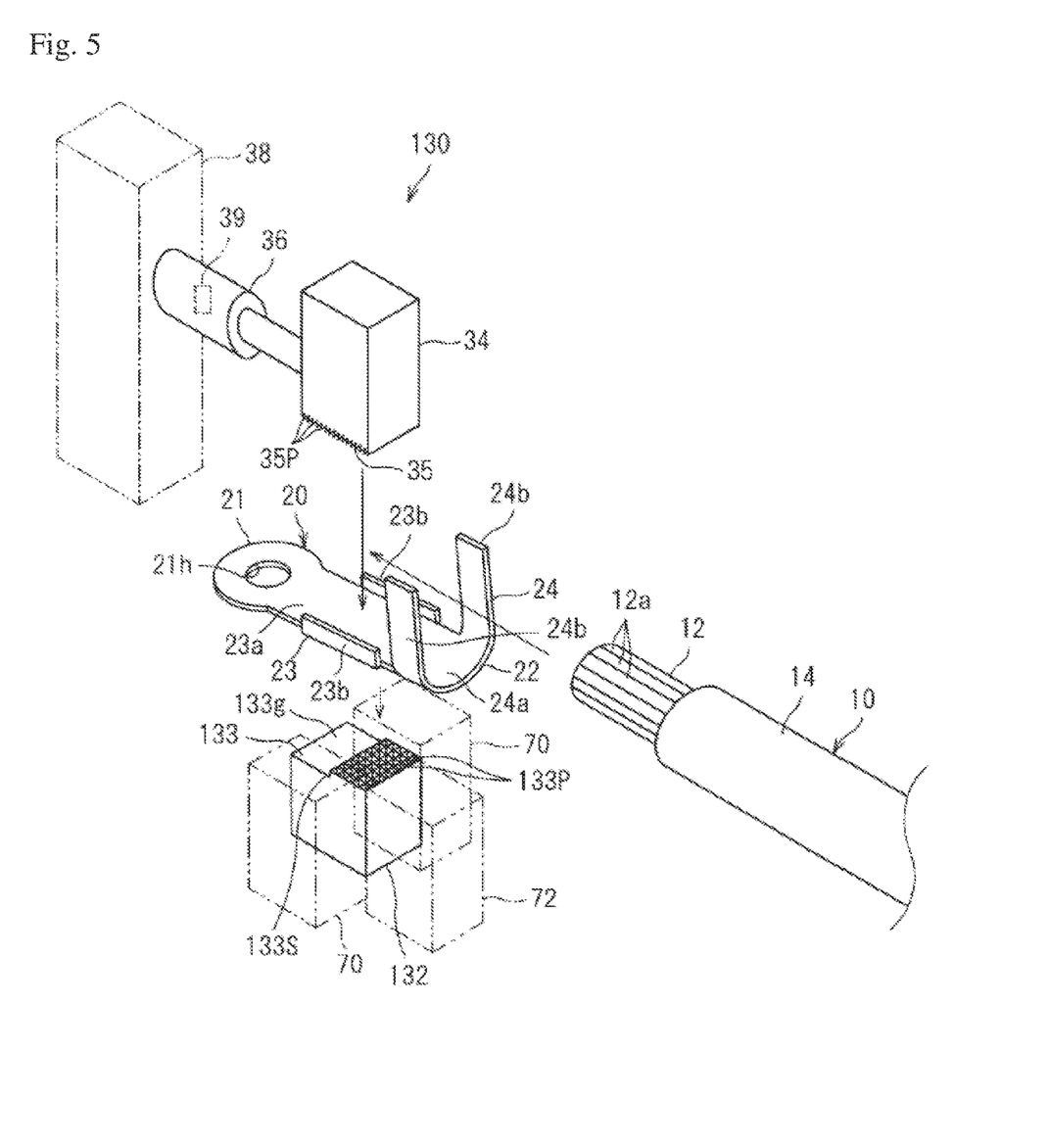
FIG. 5 is a schematic perspective view illustrating an ultrasonic bonding device.

An example of an ultrasonic bonding device applied to the manufacture of the junction above is now described. FIG. 5 is a schematic perspective view illustrating an ultrasonic bonding device 130.

First, the core wire 12 and the terminal 20 (the bonding object) are described.

The core wire 12 is an aggregate of the plurality of strands 12a. Normally, the plurality of strands 12a are twisted together. The strand 12a is formed of a metal wire such as copper, a copper alloy, aluminum, or an aluminum alloy. The coating 14 is formed on an outer circumference of the core wire 12 with an extrusion coating of resin or the like. That is, the core wire 12 is the core wire 12 of the electrical wire 10. The coating 14 is stripped away at an end portion of the electrical wire 10 and the end portion of the core wire 12 is exposed at the end portion of the electrical wire 10. The coating 14 is not necessarily formed around the core wire 12. A braided wire in which metal wires are braided in a cylindrical shape may also be used as the core wire 12.

The terminal 20 is a member formed by, for example, press molding a metal plate of copper, a copper alloy, or the like, and includes a mating connection portion 21 and the wire connection portion 22.

The mating connection portion 21 is a portion connected to a mating conductive portion such as a mating terminal or a metal body of a vehicle. In this example, the mating connection portion 21 is configured to have a bolt insertion hole 21h formed in a plate-like portion (in this example, a round plate). That is, in this example, a circular terminal used as a grounding terminal or the like is conceived as the terminal 20. The mating connection portion 21 may also be formed in a tab- or pin-like male terminal shape, or in a cylindrical or squared tubular female terminal shape, for example.

The wire connection portion 22 is a portion connected to the electrical wire 10. The wire connection portion 22 is a portion provided continuously with one end portion of the mating connection portion 21, and includes a core wire connection portion 23 and a coating connection portion 24. The core wire connection portion 23 is provided on a side closer to the mating connection portion 21, and the coating connection portion 24 is provided on a side farther from the mating connection portion 21.

The core wire connection portion 23 includes a plate-like bottom 23a and a pair of side walls 23b on two sides of the bottom 23a. The bottom 23a is connected to the mating connection portion 21, and the pair of side walls 23b stand upright from two side portions of the bottom 23a facing a first principal surface side of the bottom 23a. Also, the core wire 12 is ultrasonically bonded to the first principal surface of the bottom 23a, between the pair of side walls 23b. The pair of side walls 23b may also be omitted.

The coating connection portion 24 includes a bottom 24a and a pair of swaging tabs 24b. The bottom 24a is connected to the bottom 23a and extends in the opposite direction from the mating connection portion 21. The pair of swaging tabs 24b rise from two side portions of the bottom 24a on a first principal surface side of the bottom 24a. Also, the end portion of the coating 14 is arranged on the first principal surface of the bottom 24a, and in this state the pair of swaging tabs 24b are swaged and deformed inward. Accordingly, the end portion of the coating 14 is swaged and fixated between the bottom 24a and the pair of swaging tabs 24b. The coating connection portion 24 may also be omitted.

The ultrasonic bonding device 130 is used to ultrasonically bond the core wire 12 and the terminal 20, and includes a placement portion 132, the pressing portion 34, and the ultrasonic vibration imparter 36. The placement portion 132 is configured to be capable of supporting the wire connection portion 22 of the terminal 20 (bonding object) in a placed state. The pressing portion 34 is configured to be capable of pressing the end portion of the core wire 12, which is overlaid on the wire connection portion 22, toward the wire connection portion 22. The ultrasonic vibration imparter 36 is configured to be capable of imparting ultrasonic vibration to the pressing portion 34 in a state where the pressing portion 34 is supported in cantilever fashion. Also, in a state where the overlapped material of the wire connection portion 22 and the core wire 12 is sandwiched between the placement portion 132 and the pressing portion 34, the ultrasonic vibration imparter 36 is configured to be capable of ultrasonically bonding the components.

A more concrete description is now given.

The placement portion 132 is a member that is also referred to as an anvil, and is configured to be capable of supporting the bottom 23a of the core wire connection portion 23 of the terminal 20 in a placed state. A placement surface 133 is formed on an upper surface of the placement portion 132, the placement surface 133 supporting the bottom 23a of the core wire connection portion 23 of the terminal 20 in a placed state. The shape of the placement portion 132 is formed in a shape where, for example, both corners on one end of a rectangular parallelepiped block shape are cut off (a "home base" shape as viewed from above). The shape of the placement portion 132 is not particularly limited, so long as the shape can support the bottom 23a in the placed state. In FIG. 5, for example, the placement portion 132 is drawn in a simplified form.

Figure 6:
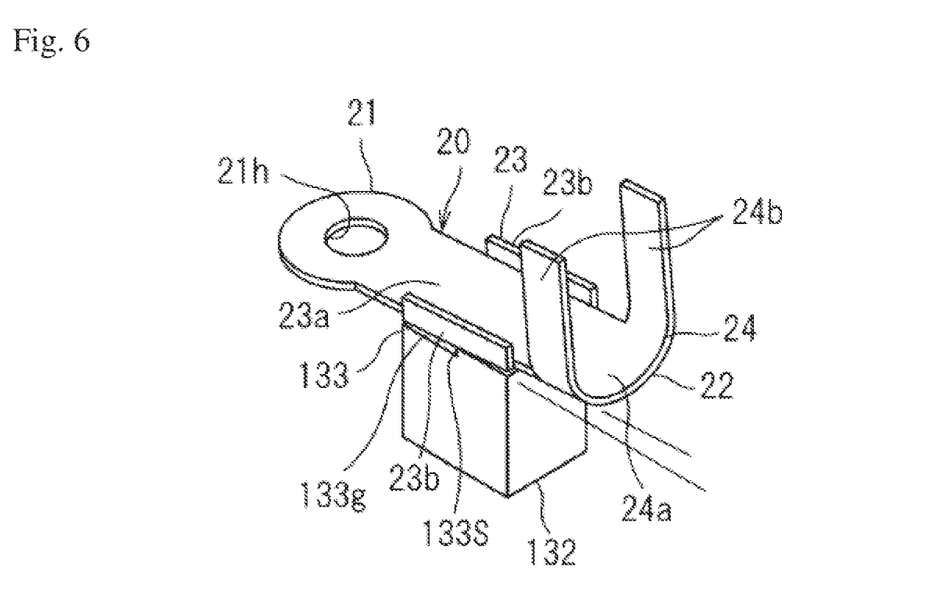
FIG. 6 is a schematic perspective view illustrating a state where a terminal is supported on a placement portion of an anvil.

The placement surface 133 is formed in a shape that supports the bottom 23a (bonding object) in a manner where the placement surface 133 inclines in the pressing direction (here, a down direction) of the pressing portion 34 progressively toward the side where the pressing portion 34 is cantilever supported (here, the forefront end side of the core wire 12). More specifically, the placement surface 133 is formed in a shape where a portion toward the forefront end of the core wire 12 is recessed with respect to the base end side of the core wire 12 via a step portion 133S. When the bottom 23a is placed on the placement surface 133 and a downward force is applied to the bottom 23a, as illustrated in FIG. 6, in a state where the portion of the bottom 23a toward the base end of the core wire 12 is supported at an upper position of the step portion 133S, the portion of the bottom 23a toward the forefront end of the core wire 12 displaces so as to sink into a depression 133g in the placement surface 133 on the forefront end side of the core wire 12. Accordingly, the bottom 23a is supported on the placement surface 133 in a posture that inclines downward on the forefront end side of the core wire 12.

The placement surface 133 may also be a smooth surface, or to inhibit slipping with respect to the bottom 23a, the placement surface 133 may also be a surface provided with fine unevenness. In FIG. 5, a phase is illustrated where square pyramidal projections 133P are formed in lines with no gaps, on a high portion of the placement surface 133 on the other side of the step portion 133S. That is, this example is configured with a plurality of projections 133P formed on a portion toward the opposite side of the placement surface 133 from the side where the pressing portion 34 is cantilever supported, the projections 133P projecting further than the portion on the side where the pressing portion 34 is cantilever supported.

Figure 7:
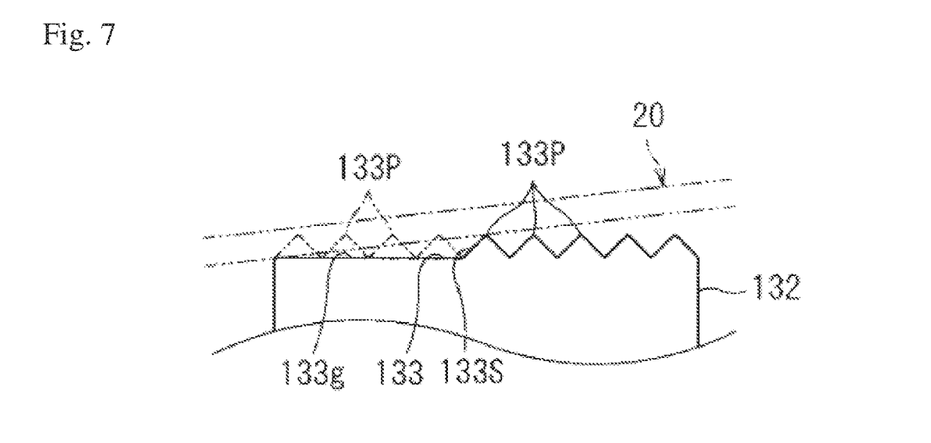
FIG. 7 is an explanatory diagram illustrating an exemplary method of forming the placement portion.

In a case that takes a configuration where a plurality of projections are formed on the entire upper surface of a placement portion and alters this to a configuration that supports the bottom 23a on the upper surface of the placement portion in an inclined posture, the placement portion 132 described above can be manufactured when, as illustrated in FIG. 7, the plurality of projections 133P are formed on the upper surface of the placement portion and only the portion of the projections 133P formed in a region on the core wire 12 forefront end side of the plurality of projections 133P is cut away and removed, and the projections 133P on the core wire 12 base end side of the upper surface of the placement portion are left behind. In such a case, with the portion on the core wire 12 forefront end side of the placement portion 132, the bottom 23a can be supported at a position that is lower by the height dimension of the projections 133P than the portion on the base end side, and also the bottom 23a can be supported in an inclined posture. In such a case, the placement portion 132 that supports the bottom 23a in an inclined posture can be configured with easy and minor processing of a placement portion that is in general use.

The pressing portion 34 is a member called a sonotrode or the like, and is provided at a position facing the placement portion 132 across a gap, which in this example is a position on the placement portion 132 that is upward of the placement surface 133, so as to be capable of moving closer to and further away from the placement surface 133. The pressing surface 35 is formed on a lower portion of the pressing portion 34, the pressing surface 35 pressing the end portion of the core wire 12 that is overlaid on the bottom 23a. In an initial posture, the pressing surface 35 has a posture that is orthogonal to the pressing direction (in this example, the pressing direction is the direction of gravity, and therefore is a horizontal posture perpendicular to the direction of gravity). The shape of the pressing portion 34 is, for example, a longitudinally long plate shape, and is formed in a shape where a front surface thereof (surface on the electrical wire side) inclines gradually at the base end side (forefront end side of the terminal) toward a top end side and bottom end side. The shape of the pressing portion 34 is not particularly limited, so long as the shape is capable of pressing against the core wire 12 from the upper side of the bottom 23a. In FIG. 5, for example, the pressing portion 34 is drawn in a simplified form.

Figure 8:
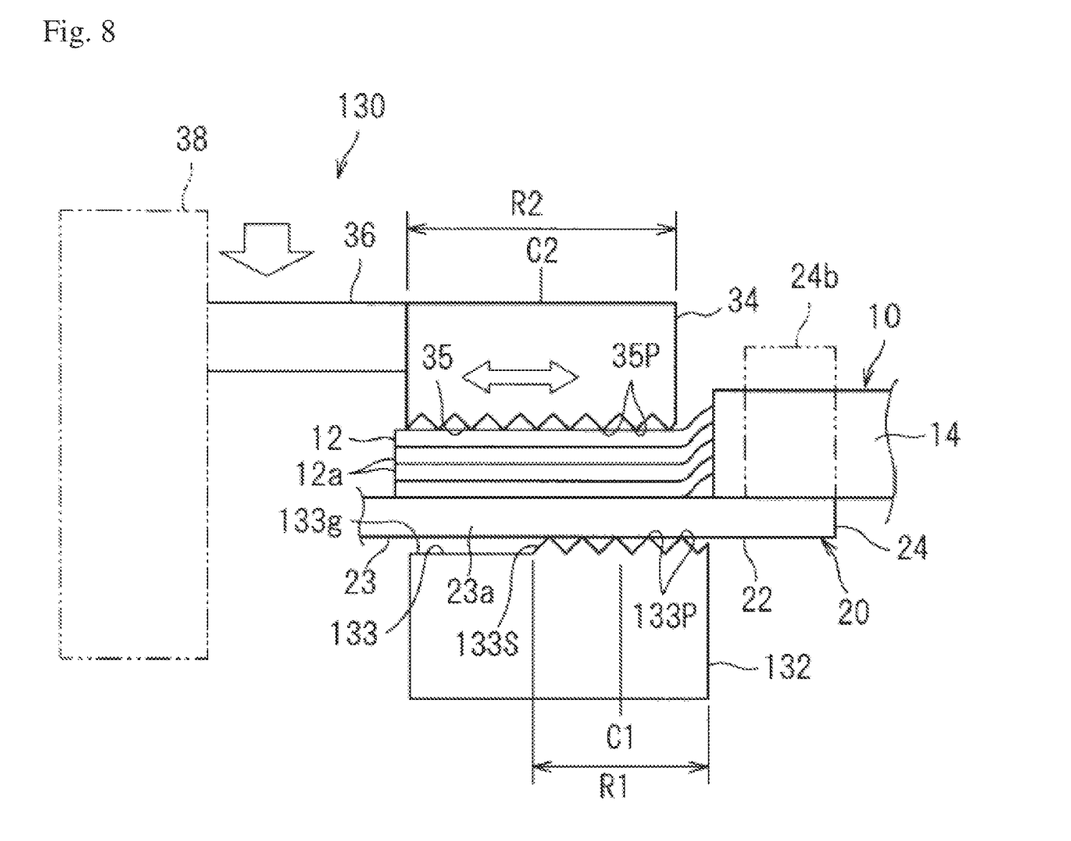
FIG. 8 is an explanatory diagram illustrating an ultrasonic bonding step.

The pressing surface 35 of the pressing portion 34 may also be a smooth surface, or to inhibit slipping with respect to the core wire 12, the pressing surface 35 may also be a surface provided with fine unevenness. FIG. 8 illustrates a phase where V-shaped projections 35P that extend along a width direction of the pressing surface 35 are formed on the pressing surface 35 in parallel lines along an extension direction of the core wire 12. In this case, the pressing portion 34 presses the core wire 12 toward the bottom 23a in regions where the projections 35P are formed.

The ultrasonic vibration imparter 36 is formed in an elongated shape, and one end portion thereof is connected to a portion of an outer circumference of the pressing portion 34. In other words, the ultrasonic vibration imparter 36 is connected so as to project outward from a portion of the outer circumference of the pressing portion 34. In addition, another end portion of the ultrasonic vibration imparter 36 is connected in a horizontal posture to an elevation driver 38 that is configured by a linear actuator such as a fluid cylinder (hydraulic cylinder, air cylinder) or a linear motor. In addition, the ultrasonic vibration imparter 36 and the pressing portion 34 at the forefront end thereof are lowered toward the placement portion 132 or are lifted in a direction away from the placement portion 132 by drive from the elevation driver 38.

When the pressing portion 34 is lowered by the drive from the elevation driver 38, the pressing portion 34 abuts the core wire 12 and the bottom 23a that are placed on the placement portion 132, whereupon downward movement is curtailed. On the other hand, a force attempting to move downward acts on a portion of the pressing portion 34 that is connected to the ultrasonic vibration imparter 36. When this happens, due to deformation of the ultrasonic vibration imparter 36, deformation of connecting locations at both ends thereof, or the like, the pressing surface 35 inclines downward (in the pressing direction) progressively toward the side that is cantilever supported (side where the ultrasonic vibration imparter 36 is connected). That is, when the pressing portion 34 presses in the predetermined pressing direction, the ultrasonic vibration imparter 36 supports the pressing portion 34 in a state where the pressing surface 35 is capable of modifying its posture to the inclined posture.

In addition, the ultrasonic vibration imparter 36 includes an ultrasonic vibration generating source 39 that generates the ultrasonic vibration, and the ultrasonic vibration generated by the ultrasonic vibrator 39 is imparted to the core wire 12 and the bottom 23a via the pressing portion 34. Normally, the ultrasonic vibration is imparted to the core wire 12 and the bottom 23a as vibration in a direction along the extension direction of the core wire 12.

An auxiliary support 70 that presses and supports the terminal 20 from two sides is provided at two side portions of the placement portion 132, and an auxiliary placement portion 72 that supports the coating connection portion 24 as on a stage is provided to a lower portion of the placement portion 132 on the side where the coating connection portion 24 extends. The auxiliary support 70 and the auxiliary placement portion 72 may also be omitted.

<Method of Bonding Core Wire and Bonding Object>

A method of bonding a core wire and the terminal 20 (bonding object) using the ultrasonic bonding device 130 is described.

First, the bottom 23a of the terminal 20, serving as the bonding object, is supported on the placement portion 132 as on a stage (see FIGS. 5 and 6, step (a)).

Next, the core wire 12 is overlaid on the bottom 23a (see FIG. 8, step (b)).

Figure 9:
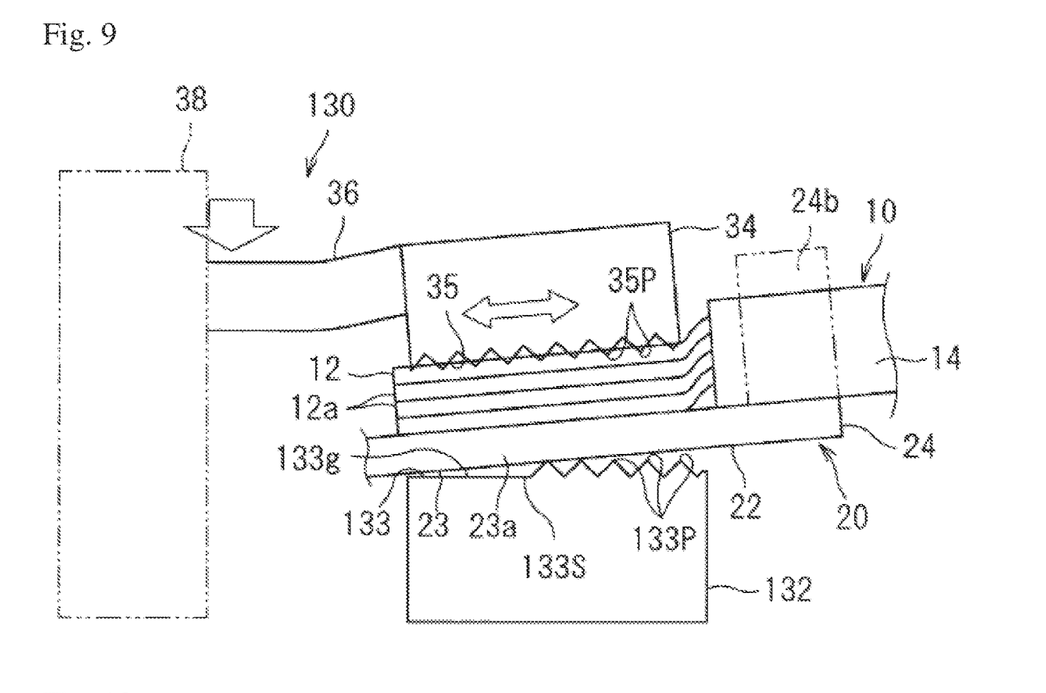
FIG. 9 is an explanatory diagram illustrating an ultrasonic bonding step.

Then, as illustrated in FIG. 8, the cantilever-supported pressing portion 34 is lowered by the drive of the elevation driver 38 and the pressing surface 35 is brought into contact with the core wire 12. Accordingly, the core wire 12 is pressed toward the bottom 23a by the pressing portion 34. The pressing portion 34 is further lowered by the drive of the elevation driver 38 and, as illustrated in FIG. 9, the core wire 12 is pressed firmly toward the bottom 23a by the pressing portion 34. In this state, the ultrasonic vibration from the ultrasonic vibration imparter 36 is transmitted to the contact portion between the core wire 12 and the bottom 23a via the pressing surface 35, and the two components are ultrasonically bonded (step (c)).

In this example, the force of the pressing portion 34 moving downward is received by the placement portion 132 below, mediated by the core wire 12 and the bottom 23a. In addition, the pressing portion 34 is supported in cantilever fashion by the ultrasonic vibration imparter 36 that moves downward, and the downward force is received from the ultrasonic vibration imparter 36 side. Therefore, the pressing surface 35 attempts to achieve a posture inclined downward progressively toward the ultrasonic vibration imparter 36 side, which is the side that is cantilever supported. The inclined posture in FIG. 9 depicts an exaggerated state of deformation and the like of the ultrasonic vibration imparter 36.

In addition, a center C1 of a region R1 where the projections 133P are formed on the placement portion 132 is positioned closer to the base end side of the core wire 12 in the extension direction of the core wire 12 than is a center C2 of a region R2 where the projections 35P are formed on the pressing portion 34. Therefore, the core wire 12 and the bottom 23a attempt to achieve a posture inclined downward progressively toward the forefront end side of the core wire 12, i.e., the ultrasonic vibration imparter 36 side, which is the side that supports the pressing portion 34.

As a result, the bottom 23a and the core wire 12 also attempt to incline in the same inclination direction as that in which the pressing surface 35 attempts to achieve an inclined posture, as described above.

Therefore, a gap between the pressing surface 35 and the upper surface (contact surface) of the bottom 23a is less likely to gradually widen toward the opposite side from the side where the pressing portion 34 is cantilever supported, and the core wire 12 is less likely to be pushed out from the gap between the bottom 23a and the pressing surface 35. In this state, the core wire 12 and the bottom 23a can be effectively ultrasonically bonded by imparting ultrasonic vibration.

<Junction of Core Wire and Bonding Object>

Figure 10:
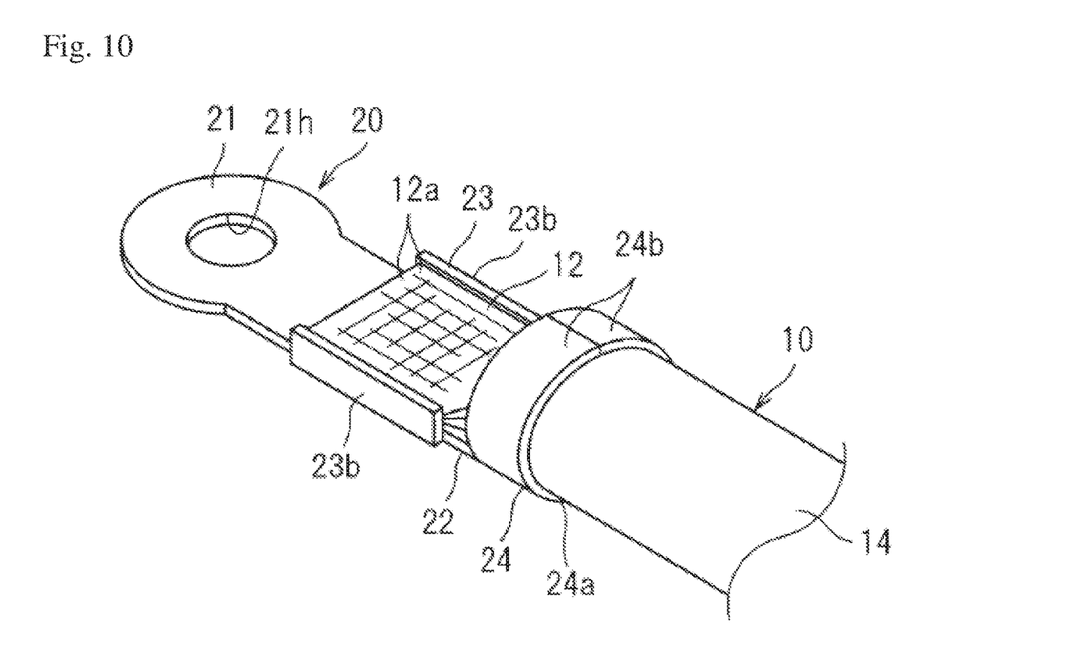
FIG. 10 is a schematic perspective view illustrating a junction between the core wire and the terminal.
Figure 11:
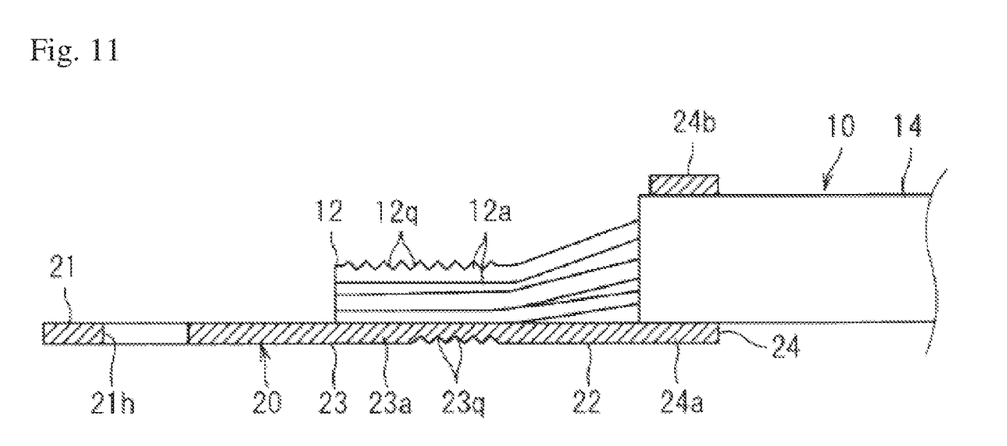
FIG. 11 is a schematic cross-sectional view illustrating the junction between the core wire and the terminal.

FIG. 10 is a schematic perspective view illustrating an exemplary junction that is manufactured between the core wire 12 and the bonding object (in this example, the terminal 20). FIG. 11 is a schematic cross-sectional view of the junction.

The junction of the terminal 20 and the core wire 12 is configured by ultrasonically bonding the core wire 12 of the electrical wire 10 with the terminal 20. Specifically, the core wire 12 and the bottom 23a are overlapped as described above, pressure is applied in this state, and the components are ultrasonically bonded. The two bonded portions have a structure in which the core wire 12 and the bottom 23a overlap in a flat state. The core wire 12 and the bottom 23a are ultrasonically bonded, and the plurality of strands 12a are also ultrasonically bonded to each other. Although an outward-facing surface of the core wire 12 and an outward-facing surface of the bottom 23a may be parallel, there may also be cases where they are not parallel. In either case, the outward-facing surface of the core wire 12 and the outward-facing surface of the bottom 23a are closer to a parallel relationship than in a case where the surface of the bottom 23a that is to be bonded is not inclined in the above-noted direction.

Also, in the configuration using the ultrasonic bonding device 130, the placement surface 133 supports primarily the bottom 23a as on a stage, at a position nearer to the base end side of the core wire 12 and, in contrast, the pressing surface 35 presses against the core wire 12 over a region that is broader along the extension direction of the core wire 12. Therefore, a plurality of depressions 23q that reflect the shape of the projections 133P are formed on a first side of a region that is ultrasonically bonded to the core wire 12, which is the outward-facing surface on the opposite side of the bottom 23a from the core wire 12 (region closer to the base end side along the extension direction of the core wire 12). Also, a plurality of depressions 12q that reflect the shape of the projections 35P are formed on an outward-facing portion of the core wire 12 on the opposite side from the bottom 23a, in a region that is broader than the region where the depressions 23q are formed. In this example, the depressions 23q are formed in a region biased toward the base end side of the core wire 12, although when the side where the pressing portion 34 is cantilever supported is the base end side of the core wire 12, the depressions may also be formed in a region biased toward the forefront end side of the core wire 12.

Also, the coating connection portion 24 is swaged and fixated to the end portion of the coating 14.

<Effects, etc.>

According to the method of bonding the core wire 12 and the terminal 20 as the bonding object, the ultrasonic bonding device 130, and the junction between the core wire 12 and the terminal 20 as the bonding object, configured as above, the core wire 12 and the bottom 23a of the terminal 20 are ultrasonically bonded in a state where the core wire 12 is pressed toward the terminal 20 by the pressing portion 34, which is supported in cantilever fashion. At this time, the pressing portion 34 is inclined, and the pressing surface 35 inclines in the pressing direction (downward) progressively toward the side where the pressing portion 34 is cantilever supported. Under these circumstances, the bonding surface of the bottom 23a is in a state on the placement portion 132 of inclining in the same direction, that is, of inclining in the pressing direction (downward) progressively toward the side where the pressing portion 34 is cantilever supported. Accordingly, the pressing surface 35 and the bonding surface of the bottom 23a can be configured in a positional relationship that is as parallel as possible. In addition, by performing the ultrasonic bonding in this state, the core wire 12 is less likely to be pushed out through the gap between the pressing portion 34 and the bottom 23a. Accordingly, using the ultrasonic bonding device 130 that cantilever supports the pressing portion 34, the end portion of the core wire 12 and the bottom 23a can be more reliably bonded.

The ultrasonic bonding device 130 that cantilever supports the pressing portion 34 also has the benefits of the device configuration being simpler and device costs being cheaper compared to ultrasonic bonding devices that support both ends of the pressing portion 34 or the like.

In addition, with a configuration in which the bonding surface of the bottom 23a is inclined and supported as described above, the placement portion 132 is used that is capable of supporting the bottom 23a in a state where the bottom 23a is inclined in the pressing direction progressively toward the side where the pressing portion 34 is cantilever supported, and therefore the end portion of the core wire 12 and the bottom 23a can be more reliably bonded, without using a terminal or the like having a special shape.

A configuration is used as the placement portion 132 in which the plurality of projections 133P are formed on the portion toward the opposite side of the placement portion 132 from the side where the pressing portion 34 is cantilever supported, the projections 133P projecting past the portion on the side where the pressing portion 34 is cantilever supported. Therefore, the placement portion 132 that is capable of supporting the bottom 23a in an inclined posture can be readily manufactured, even without forming the placement surface of the placement portion in an inclined posture or the like. Also, the plurality of projections 133P also play a role of supporting the bottom 23a in a non-slip state.

<Modifications>

Various modifications predicated on the embodiment above are described.

Figure 12:
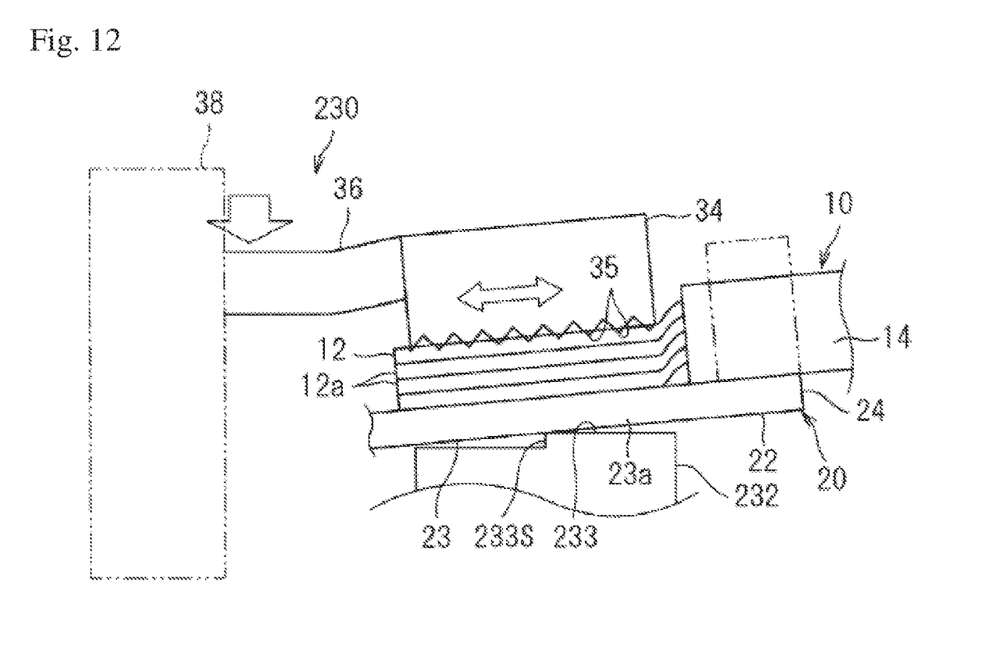
FIG. 12 is a schematic view illustrating an ultrasonic bonding device according to a first modification.

FIG. 12 is a schematic view illustrating an ultrasonic bonding device 230 that uses a placement portion 232 according to a first modification. In the first modification, an upward-facing placement surface 233 of the placement portion 232 that corresponds to the placement portion 132 is formed in a shape that is recessed via a step portion 233S on the side where the pressing portion 34 is cantilever supported. In addition, a surface on a side that projects via the step portion 233S and a surface on a side that is recessed are each formed as flat surfaces. Even in these cases, when the core wire 12 is pressed toward the bottom 23a side by the pressing portion 34, the bottom 23a inclines so as to descend toward the recessed side, and therefore, similar to the embodiment above, the end portion of the core wire 12 and the bottom 23a can be more reliably bonded.

Figure 13:
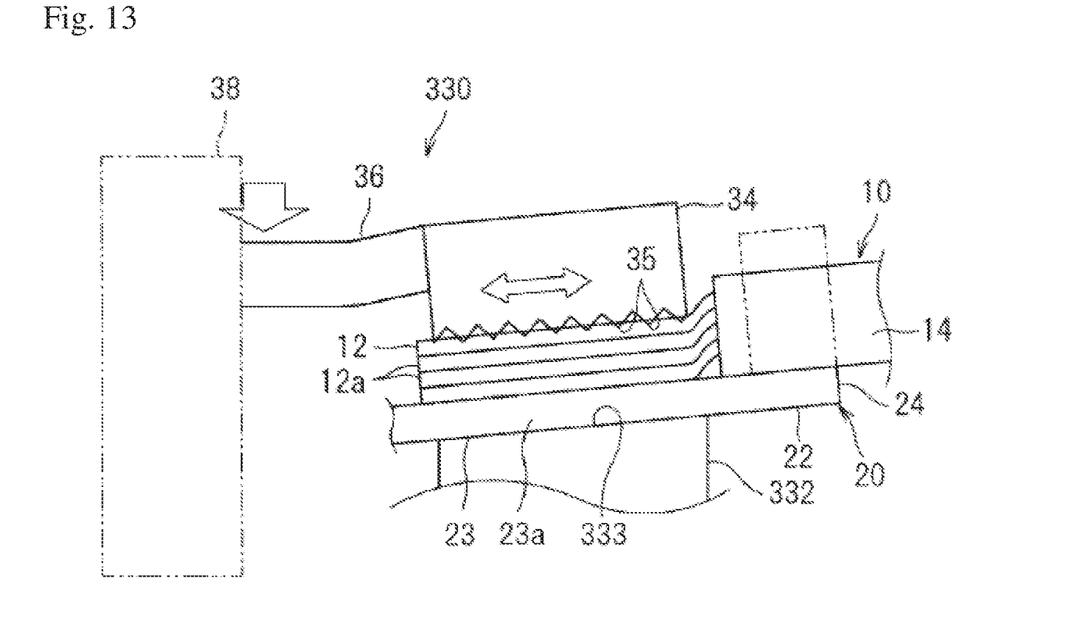
FIG. 13 is a schematic view illustrating an ultrasonic bonding device according to a second modification.

FIG. 13 is a schematic view illustrating an ultrasonic bonding device 330 that uses a placement portion 332 according to a second modification. In the second modification, an upward-facing placement surface 333 of the placement portion 332 that corresponds to the placement portion 132 is formed in an inclined shape that descends downward gradually toward the side where the pressing portion 34 is cantilever supported. Therefore, when the core wire 12 is pressed toward the bottom 23a side by the pressing portion 34, the bottom 23a inclines so as to descend toward the recessed side, and therefore, similar to the embodiment above, the end portion of the core wire 12 and the bottom 23a can be more reliably bonded.

Figure 14:
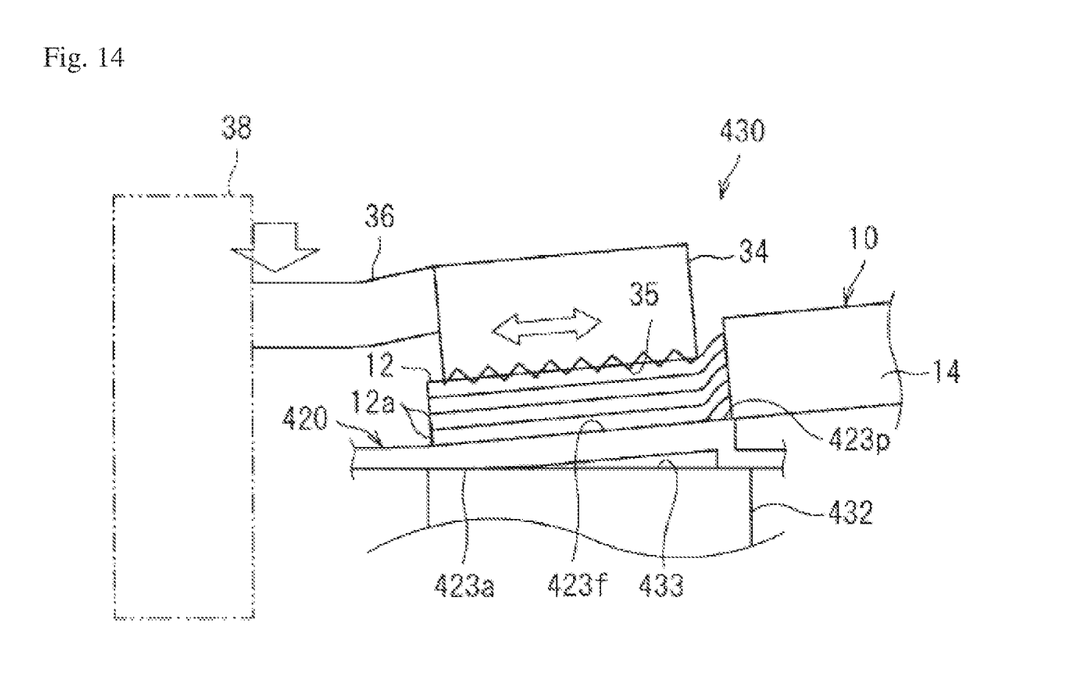
FIG. 14 is a schematic view illustrating a terminal according to a third modification.
Figure 15:
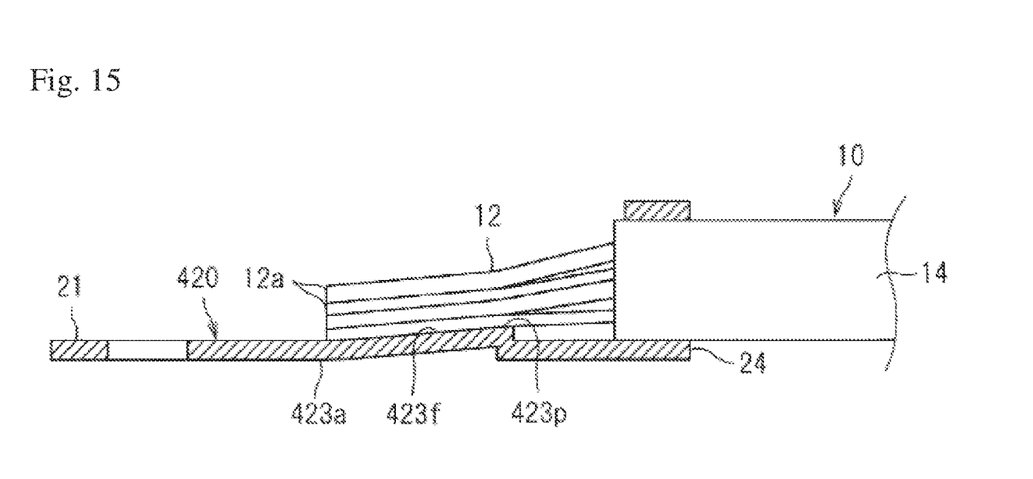
FIG. 15 is a schematic view illustrating a terminal according to the second modification.

FIGS. 14 and 15 are schematic views illustrating a terminal 420 according to a third modification. In this modification, an upward-facing placement surface 433 of the placement portion 432 that corresponds to the placement portion 132 is configured in a horizontal posture. That is, the ultrasonic bonding device 430 has a similar configuration to that which is in general use.

Instead, a bottom 423a of a terminal 420 that corresponds to the terminal 20 is formed in a shape having a sloped surface 423f where a height dimension decreases gradually toward the mating connection portion 21. In this example, a projection 423p is formed by forming a width direction center of the bottom 423a so as to partially project toward the first principal surface side (side where the core wire 12 is bonded). When viewing the bottom 423a from the opposite side, the projection 423p is observed as recessed. Also, a surface on a side of the projection 423p where the side walls 23b project is formed as the sloped surface 423f where the height dimension decreases gradually toward the mating connection portion 21.

According to this modification, the bottom 423a is supported as on a stage on the placement surface 433, which has a horizontal posture, and the core wire 12 is arranged thereon, and when the core wire 12 is pressed by the pressing portion 34, a direction in which the pressing surface 35 of the pressing portion 34 that is supported in a cantilevered state inclines is the same as the inclination direction of the sloped surface 423f. Similar to the embodiment above, the end portion of the core wire 12 and the bottom 423a can be more reliably bonded.

In the embodiment and each of the modifications, an example is described where the core wire 12 bonds to the terminal 20 as the bonding object. However, the bonding object may also be another metal object, for example a core wire.

Each configuration described in the above embodiment and each of the modifications can be combined as appropriate so long as they do not contradict each other. For example, a configuration where the bottom 23a is supported in an inclined posture by the placement portion 132, as in the embodiment, may be combined with a configuration where a portion of the bottom 423a of the terminal has an inclined shape, as in the third modification.

In the above, the present invention is described in detail. However, the above description is, in all aspects, for exemplary purposes and the present invention is not limited thereto. Numerous modifications not given as examples are understood to be conceivable without departing from the scope of the present invention.

Figure 16:
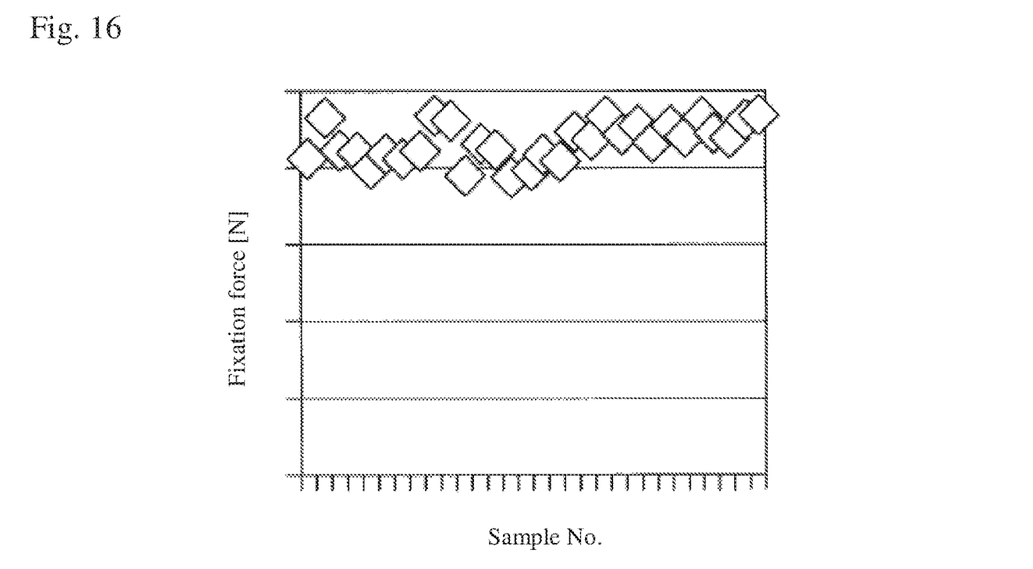
FIG. 16 illustrates the fixation force of a plurality of samples in which the core wire and the terminal are ultrasonically bonded in an embodiment.

FIG. 16 illustrates a relationship between a fixation force and a sample number in a case where the core wire 12 and the terminal 20 are actually ultrasonically bonded using a method according to the embodiment above. As illustrated in the drawing, it is learned that a stable fixation force can be obtained in a large number of samples.

DESCRIPTION OF REFERENCE NUMERALS

10 Electrical wire
12 Core wire
12a Strand
12q Depression
20 Terminal
22 Wire connection portion
23 Core wire connection portion
23a Bottom
23q Depression
34 Pressing portion
35 Pressing surface
35P Projection
36 Ultrasonic vibration imparter
39 Ultrasonic vibrator
130, 230, 330 Ultrasonic bonding device
132, 232, 332 Placement portion
133, 233, 333 Placement surface
133P Projection
133S, 233S Step portion
133g Depression
420 Terminal
423f Sloped surface
423p Projection

What is claimed is:

1. A method of bonding a core wire and a bonding object that ultrasonically bonds a core wire that contains a plurality of strands and a bonding object, the method comprising:
   (a) supporting the bonding object;
   (b) overlaying the core wire on the bonding object; and
   (c) ultrasonically bonding the core wire and the bonding object in a condition in which the core wire is pressed toward the bonding object, using a pressing portion that is supported in cantilever fashion,
   wherein during the bonding a pressing surface of the pressing portion is inclined in a pressing direction of the pressing portion progressively toward a side where the pressing portion is cantilever supported, and also a bonding surface of the bonding object is inclined in the pressing direction of the pressing portion progressively toward the side where the pressing portion is cantilever supported.

2. The method of bonding the core wire and bonding object according to claim 1, wherein the bonding object is supported on a placement portion that is configured to support the bonding object in a condition in which the bonding object is inclined in the pressing direction of the pressing portion progressively toward the side where the pressing portion is cantilever supported.

3. The method of bonding the core wire and bonding object according to claim 2, wherein the placement portion has a plurality of projections formed on a portion toward an opposite side of the placement portion from the side where the pressing portion is cantilever supported, the projections protruding past a portion on the side where the pressing portion is cantilever supported.

4. The method of bonding the core wire and bonding object according to claim 1, wherein the core wire is ultrasonically bonded to a terminal as the bonding object.

5. An ultrasonic bonding device comprising:
a placement portion that supports a bonding object;
a pressing portion that presses a core wire overlaid on the bonding object against the bonding object on the placement portion; and
an ultrasonic vibration imparter that imparts ultrasonic vibration to the pressing portion, the pressing portion being supported in cantilever fashion,
wherein the ultrasonic vibration imparter, when the core wire is pressed against the bonding object with the pressing portion, supports the pressing portion in cantilever fashion such that a pressing surface of the pressing portion inclines in a pressing direction of the pressing portion progressively toward a side where the pressing portion is cantilever supported, and
the placement portion supports the bonding object in a condition in which the bonding object is inclined in the pressing direction of the pressing portion progressively toward the side where the pressing portion is cantilever supported.

6. The ultrasonic bonding device according to claim 5, wherein a plurality of projections are formed on a portion of the placement portion toward an opposite side of the placement portion from the side where the pressing portion is cantilever supported, the projections protruding past a portion on the side where the pressing portion is cantilever supported.

7. A junction between a core wire and a bonding object comprising:
a core wire that contains a plurality of strands; and
a bonding object that is ultrasonically bonded to the core wire in a condition overlapping with the core wire,
wherein a plurality of depressions are formed on a portion corresponding to a first side of a region on the bonding object that is ultrasonically bonded to the core wire, which is on an opposite side of the bonding object from the core wire,
the core wire is a core wire of an electrical wire having a coating formed on an outer circumference thereof, and the coating is stripped away at an end portion of the electrical wire and an end portion of the core wire is exposed,
the bonding object is a terminal that includes a wire connection portion, which includes a plate portion, and a mating connection portion,
in a condition in which the electrical wire extends in an opposite direction from the mating connection portion, the end portion of the core wire is ultrasonically bonded to the plate portion of the wire connection portion,
a plurality of first depressions that reflect a shape of projections on a pressing portion for ultrasonic bonding are formed on an outward-facing portion of the end portion of the core wire on an opposite side from the plate portion of the wire connection portion, and
second depressions that reflect projections on a placement portion for ultrasonic bonding are formed on an outward-facing surface of the plate portion of the wire connection portion on an opposite side from the end portion of the core wire, in a region that is narrower in an extension direction of the core wire than a region where the first depressions are formed, and that are toward a base end side of the end portion of the core wire.

* * * * *